United States Patent [19]

Thormodsen et al.

[11] Patent Number: 5,666,759
[45] Date of Patent: Sep. 16, 1997

[54] SUSPENSION SLEEVE FOR SNOOD SWIVELS AND MATERIAL FOR SUCH A SUSPENSION SLEEVE

[75] Inventors: Tom Thormodsen, Gjøvik; Per Borgund, Hunndallen, both of Norway

[73] Assignee: O. Mustad & Son A.S., Gjovik, Norway

[21] Appl. No.: 491,858

[22] PCT Filed: Jan. 11, 1994

[86] PCT No.: PCT/NO94/00010

§ 371 Date: Sep. 5, 1995

§ 102(e) Date: Sep. 5, 1995

[87] PCT Pub. No.: WO94/15455

PCT Pub. Date: Jul. 21, 1994

[30] Foreign Application Priority Data

Jan. 13, 1993 [NO] Norway ................... 93 0122

[51] Int. Cl.$^6$ ............................................ A01K 91/98
[52] U.S. Cl. ............... 43/42.74; 43/44.84; 24/23 R; 24/271
[58] Field of Search ................. 43/27.4, 42.74, 43/43.1, 44.89, 44.9, 44.92, 43.15, 44.84; 24/908, 905, 563, 601.1, 270, 271, 20 R, 23 R

[56] References Cited

U.S. PATENT DOCUMENTS

| | | | |
|---|---|---|---|
| 1,905,449 | 4/1933 | Dunn | 43/44.85 |
| 2,267,469 | 12/1941 | Joys | 114/108 |
| 2,466,939 | 4/1949 | Fowler | 24/563 |
| 3,533,184 | 10/1970 | Kerr | 43/44.84 |
| 4,773,129 | 9/1988 | Muhr | 24/20 R |
| 4,945,671 | 8/1990 | Jonsson | 43/44.84 |
| 4,996,749 | 3/1991 | Takahashi | 24/20 R |

FOREIGN PATENT DOCUMENTS

A1 2629984  10/1989  France .
92/01372    2/1992   WIPO .

*Primary Examiner*—Jeanne Elpel
*Attorney, Agent, or Firm*—Jacobson, Price, Holman & Stern, PLLC

[57] ABSTRACT

A suspension sleeve for snood swivels, arranged to be installed around a fishing line and to rotate about the line's longitudinal axis. The sleeve (10) is made of a rectangular plate and has two end areas (2, 3) which are facing each other, considered in the sleeve's (10) circumference direction, and which have respective engagement sections (4, 20) which are arranged for releasable, firm connection with each other. One end area (2) comprises a support section (6) for an eye of the snood swivel.

2 Claims, 1 Drawing Sheet

U.S. Patent    Sep. 16, 1997    5,666,759
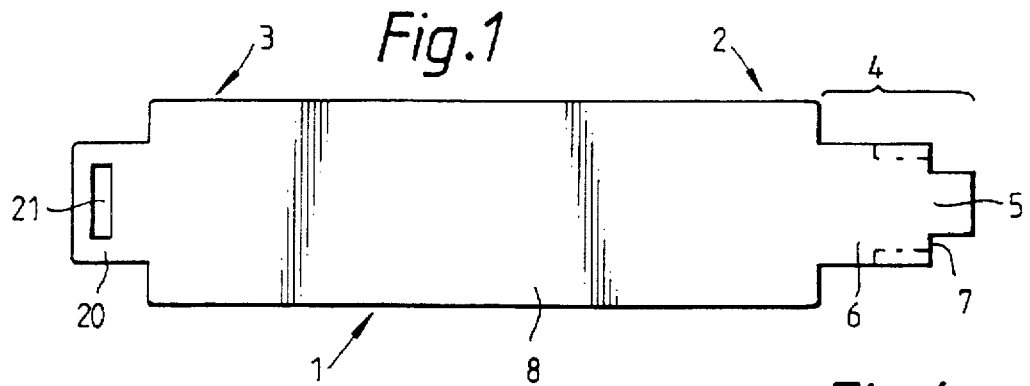
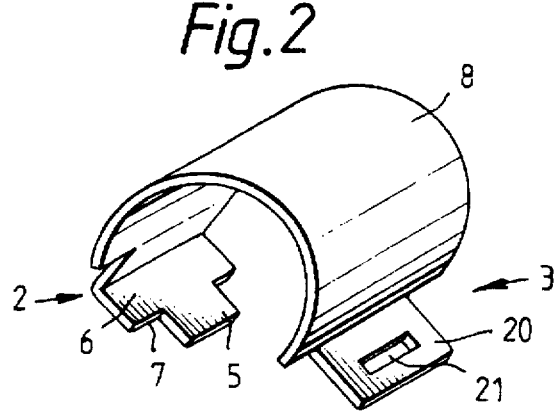
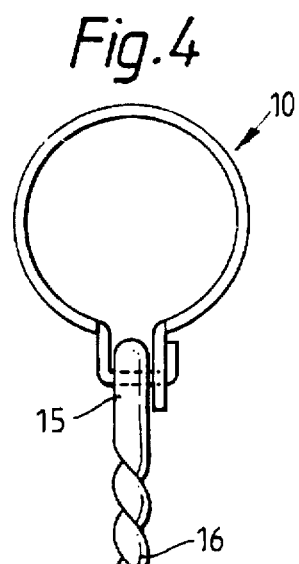
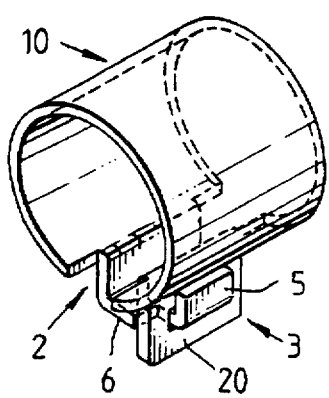
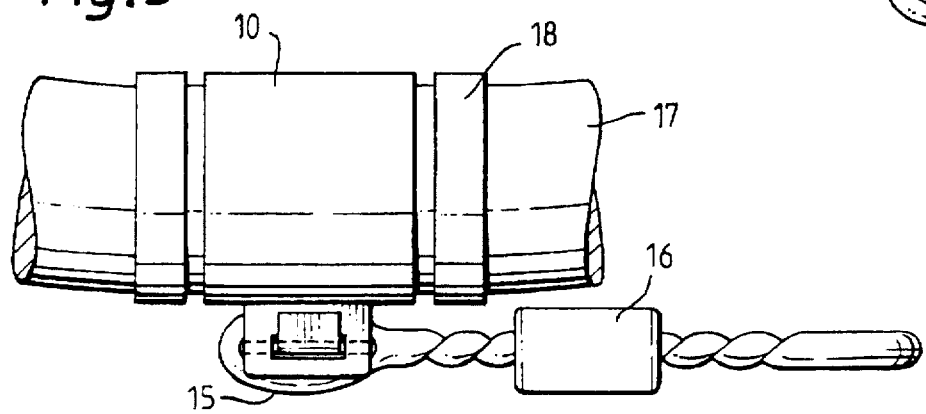

SUSPENSION SLEEVE FOR SNOOD SWIVELS AND MATERIAL FOR SUCH A SUSPENSION SLEEVE

The invention relates to a suspension sleeve for snood swivels, comprising an annular rectangular metal plate for rotating around the longitudinal axis of a fishing line, said annular plate having two facing end areas. The invention further relates to a method of making a such suspension sleeve.

Suspension sleeves of this type are known from e.g. WO92/01372 and are used in order to prevent the snoods from becoming tangled on the taut fishing line and to reduce the length of the freely suspended section of the snoods, thus making it easy for the fish which have been caught to disengage themselves.

In order to restrict the movement of the suspension sleeve along the line a stop ring is shrunk on to the line on each side of the suspension sleeve. Alternatively, in other prior art, a sliding sleeve with enlarged end sections has been moulded on to the line to form a sliding bearing for a plate curved around the sliding sleeve's central section, and which thus constitutes a suspension sleeve able to rotate easily and without the risk of its causing wear on the line, but the enlarged end sections of the sliding sleeve restricting the suspension sleeves' movement along the line.

The suspension sleeves, hereinafter called the sleeves, are made of a rectangular metal plate which is bent into an annular shape. In order to secure the swivel, a central section of the annular plate can have a radially outwardly projecting, approximately spherical segment shaped section, wherein there is provided a central slot which extends parallel to the ring's longitudinal axis. However the ductility of the material of which the plate is made is usually low. Consequently the maximum height of the spherical segment section is limited.

In this design of sleeves the swivel can be made of a piece of metal wire, whose thickness is slightly less than the width of the slot. One end section of the metal wire is composed of a straight neck section which ends in an enlarged section or a head and the other end section of the metal wire is bent in a plane in into the shape of a hook, the head's diameter being smaller than the spherical segment section's height.

Before the plate is curved into an annular shape around the line or the sliding sleeve, the swivel is threaded through the slot until only the head is located inside the spherical segment and the head abuts against it, whereafter the plate is bent around the line or the sliding sleeve. The head of the swivel is thus enclosed with clearance between the sleeve and the line or sliding sleeve, and can be moved in the raised section, its neck section protruding out through the slot.

When the snood is under a heavy lead, the sleeve may work loose from the line, the bending moment which is exerted against the sleeve causing one or both end sections of the plate of which it is made to become bent radially outwards, thus causing the opening or split between the end sections to become larger than the diameter of the line or the sliding sleeve.

When the line is hauled in it pulled on board successively by means of a driven wheel with a circumferential, radially outwardly open groove with a V-shaped cross section, in which groove a section of the line is first placed and clamped. When the wheel rotates the line becomes more securely clamped the greater the tension in the line.

The width of the track at the opening is smaller than the external diameter of the sleeves. When the line is hauled in, those sleeves which are attached to the section of the line which is located at the driving wheel will thus be made to abut against the edges of the groove's opening, as the adjacent line sections attempt to pull the sleeves radially inwards on the wheel.

During the preparations for renewed fitting the line and the snoods receive separate treatment. For this reason the sleeves are rotated, thus causing the swivels to turn radially outwards in relation to the wheel. At the same time the sleeves and the swivels are pushed towards the periphery of the wheel and the swivels attempt to move into a position in which they extend tangentially in relation to the first-mentioned wheel by means of a second wheel.

Due to the limited height which can be reached by the spherical segment of the sleeve, the possibility may arise that the swivel cannot be moved freely right up up to the position in which it extends tangentially, but that the neck section of the swivel, which is located near the head and in the slot, abuts against the edge of the slot during this movement, and that the neck section thereafter becomes bent, so that at least the remaining section of the swivel achieves the tangential position.

In this case this bending can be so great that the swivel breaks.

The object of the invention is to provide a sleeve of the type mentioned in the introduction which is not encumbered by the above-mentioned disadvantages.

The characteristics of the sleeve according to the invention are evident from the features presented in the claims presented.

The invention will now be described in more detail with reference to the drawing which schematically illustrates an embodiment of a sleeve according to the invention.

FIG. 1 is a view of a sleeve in an unfolded condition.

FIG. 2 is a perspective view of a sleeve which has been formed by means of bending at an angle and partially curving the plate shown in FIG. 1.

FIG. 3 is a perspective view of a sleeve which has been formed by means of completely curving the plate shown in FIG. 1, and where the plate's end sections are connected to each other.

FIG. 4 is an end view of the sleeve illustrated in FIG. 3 and a swivel which is connected to the sleeve.

FIG. 5 is a side view of the sleeve and swivel illustrated in FIG. 4, the sleeve being installed on a line with two stops for the sleeve and the swivel has been rotated by 90° C.

FIG. 1 shows a rectangular plate 1 which after curving to form an annular or sleeve shape forms a suspension sleeve 10 of the type mentioned in the introduction.

The plate 1 has a first and a second end area 2 and 3 which after curving of the plate to form an annular shape are facing each other considered in the ring's circumference direction.

The first end area 2 of the plate 1 has a tongue 4 with a tip section 5 and a root section 6. The width of the tip section 5 is less than the width of the root section 6, its outer area, i.e. that which faces the tip section, constituting a shoulder 7.

In its turn the width of the root section 6 is less than the width of the central area 8 of the plate which is located between the end areas, this width of the root section 6 also being less than the internal diameter of the eye 15 of a swivel 16, by means of which a snood can be connected to the sleeve 10.

The second end area 3 of the plate 1 has an end section 20 with a through-going hole 21, whose cross section which extends in the plate plane, is slightly larger than the cross section of the tongue tip section 5. As in the case of the tongue root section 6 the width of the end section 20 is less than the width of the plate's central section 8.

Before installation of the sleeve 10 on a line 17, the end section 20 and the tongue 4 are first bent at right angles in such a manner that they point the same way in relation to the central section 8, whereafter an outer area of the root section 6, i.e. an area which is located close to the tip section 5 is bent by 90°, in such a manner that it points away from the second end area.

Thereafter that section of the plate 8 which is located between the end sections 2, 3 is curved about an axis which extends parallel to the plate's transversal axis, and into an approximately annular shape as illustrated in FIG. 2, where the end areas 2, 3 are located so far from each other that the opening between the end sections is only slightly larger than the diameter of the line. Plates formed in this way are suitable for use as blanks which can be supplied to users, who themselves wish to install these on their fishing lines. Thereafter the line is inserted through the opening and the eye 15 of the swivel is threaded into the outer section of the tongue root section 6. Finally the end sections 2, 3 are pushed towards each other, thus giving the plate a completely annular shape, the tip section 5 hereby being threaded into the hole 21 until the shoulder 7 abuts against one side of the end section 20, whereafter that section of the tip section which projects out of the hole 21 on the other side of the end section 20 is radially bent at an angle inwards until its flat side abuts against the end section 20, as illustrated in FIGS. 3 and 4.

Thus the tongue 4 with the tip section 5, and the end section 20 with the hole 21, constitute engagement sections, whereby the end sections 2, 3 of the annular plate 1 can be firmly connected to each other, thus forming a sleeve which grips the line round its entire circumference.

When a force is exerted against the sleeve via the swivel, maximum bending moments are generated in it, which are considerably less than the maximum bending moments generated in the previously known, above-mentioned split sleeve, which is also made of a curved plate, but whose mutually facing end areas are not firmly connected to each other.

Thus the sleeve according to the invention can firstly be made of a thinner plate, and secondly there is no risk of the sleeve being pulled off the line due to the end sections being moved away from each other.

Since the sleeve section which is arranged to connect with the swivel is not constituting of a recess in the plate which is formed by, e.g., stamping, and whose maximum height is extremely limited and dependent on the ductility of the plate material, but of unbent plate pieces which are located between bent plate sections, a sleeve section is obtained of such a nature that it permits the swivel to be rotated in such a manner that its longitudinal axis extends in the desired direction in relation to the sleeve's longitudinal axis, e.g. parallel to it, as illustrated in FIG. 5. This figure also illustrates that on each side of the suspension sleeve there are provided stops 18 which are attached to the line and restrict the suspension sleeve's movement along the line.

The graduation of the tongue root section and the end section in relation to the plate's central section results amongst other things in these sections being bent away from the plane for adjacent areas of the central area in the desired location, since the maximum bending stresses will occur at just those graduated locations. For this purpose the plate can also be graduated between the radially extending section and the tangentially extending section of the tongue root, as indicated by the dotted lines in FIG. 1.

It is stated above that the tongue tip section 5 is bent radially inwards at an angle until it abuts against the end section 20, since this bent section is thus unlikely to be able to come into undesirable contact with extraneous bodies such as the snood or the like. However, the tongue tip section 5 can instead be bent radially outwards, which will possibly be a better way of preventing the tongue tip section from being pulled out of the hole 21 when the snood is heavily loaded.

We claim:

1. A suspension sleeve for snood swivels, comprising an annular rectangular metal plate, for rotating around the longitudinal axis of a fishing line said annular plate having two facing end areas, characterized in that, said end areas have respective first and second engagement sections which are firmly connected with each other, the first engagement section is a tongue composed of a root section and a tip section, the lateral width of said tip section is reduced in relation to the lateral width of said root section so that an intermediate shoulder is formed, and the second engagement section comprises an opening through which said tip section of said first engagement section is loosely fitted, until said shoulder abuts against said opening.

2. A method of making a suspension sleeve for snood swivels which comprises providing a blank made of a substantially rectangular metal plate having two end areas, comprising respective first and second engagement sections the first engagement section is a tongue composed of root section and a tip section, the lateral width of said tip section is reduced in relation to the lateral width of said root section to define an intermediate shoulder, and the second engagement section comprises an opening, and forming the blank into a suspension sleeve by bending the blank into a curve until the end areas are at a distance apart which corresponds to the diameter of a fishing line, bending the end areas at like angles to the blank, locating the blank over the fishing line, fitting the eye of a swivel onto said root section, fitting said tip section through said opening until said shoulder abuts against said opening and said tip section projects through said opening, then bending a protruding portion of the tip section to prevent the tip section from being withdrawn from the opening.

\* \* \* \* \*